May 24, 1960 W. A. MAHONEY 2,937,890
PIPE COUPLING FOR HEAT EXCHANGERS
Filed Dec. 21, 1955 2 Sheets-Sheet 1
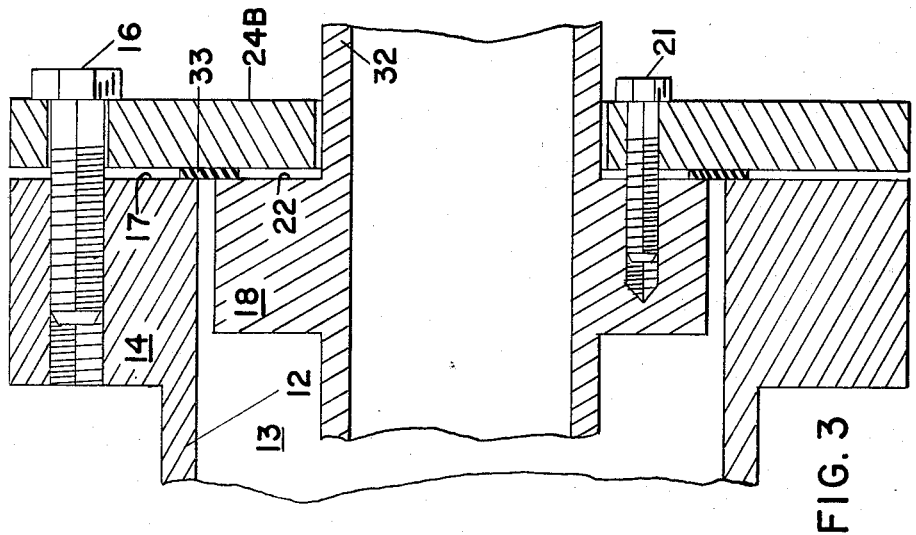
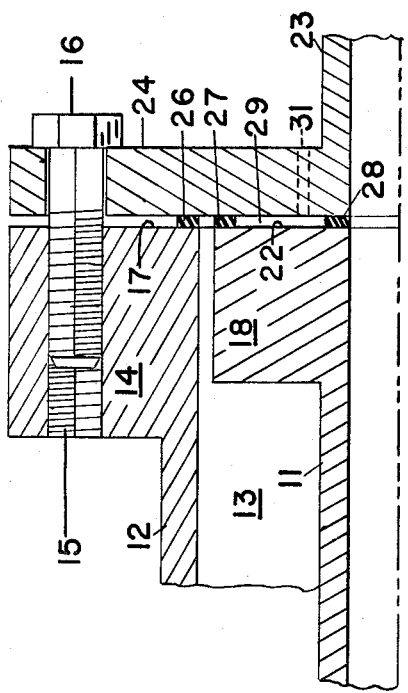
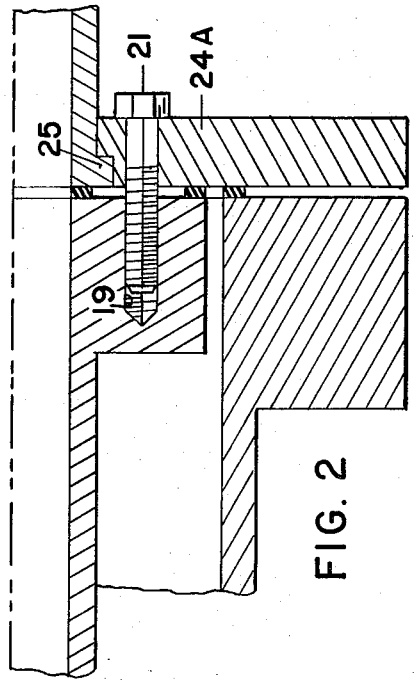
WILLIAM A. MAHONEY
*INVENTOR.*
BY
ATTORNEY May 24, 1960

W. A. MAHONEY 2,937,890

PIPE COUPLING FOR HEAT EXCHANGERS

Filed Dec. 21, 1955

WILLIAM A. MAHONEY
*INVENTOR.*

BY *Maurin W. Grady*

ATTORNEY

United States Patent Office 2,937,890
Patented May 24, 1960

2,937,890
PIPE COUPLING FOR HEAT EXCHANGERS

William A. Mahoney, Schenectady, N.Y., assignor to Alco Products, Inc., New York, N.Y., a corporation of New York Filed Dec. 21, 1955, Ser. No. 554,549

4 Claims. (Cl. 285—138)

This invention relates to pipe connections and more particularly to connections or fittings for joining two pipes of different diameters for use in heat exchangers, as illustrated in Patent #2,424,221 to J. W. Brown, Jr.

In one type of shell and tube heat exchanger now in use, a single U-tube is arranged within a pair of parallel shells in spaced relation thereto so that an annular passage for the transfer of fluid is provided. The ends of the U-tube in such a construction extend beyond the forward ends of the parallel shells in order to facilitate securement to connecting pipes which supply fluid to and receive it from the U-tube. Various types of assembled securement fittings or unions have been used which serve also as a closure for the shells and inner pipes. In order to permit easy withdrawal of the U-tube or inner pipes from the shells for repair or replacement, it is important that such fittings or connections can be easily disassembled.

In many of the connections on heat exchangers of the type described, gaskets are provided in pairs, one on each side of the joint to be sealed. They are tightened simultaneously into sealing position by one set of bolts. In the Brown patent above referred to only one gasket is shown. Hence if one of the pair of gaskets permits leakage and the bolts are tightened, objectionable pressure is exerted on the non-leaking gasket.

The principal object of the invention, therefore, is to provide a union or connection for pipes, such connection comprising an assembly which serves as a closure for two pipes, one of which is disposed within the other, and which serves also to connect the inner of said pipes to a third pipe to establish means of fluid transfer therethrough, the connection being adapted for easy disassembly so that the inner pipe may be disconnected from the third pipe and withdrawn from the shell.

Another object is to provide a novel connection for joining pipes arranged as above described, such connection having gaskets disposed in a novel manner and adapted to be tightened into sealing position independently of each other.

Other and further objects of this invention will be apparent from the following description, the accompanying drawings, and the appended claims.

In the drawings:

Fig. 1 is a partial sectional view of one embodiment of the invention applied to two concentric pipes and a connecting pipe secured to the inner of said pipes in sealing relation thereto.

Fig. 2 is a partial sectional view of the lower half of the pipes illustrated in Fig. 1 showing an alternate arrangement for securing the connecting pipe to the inner of the pipes.

Fig. 3 is a partial sectional view of another embodiment of the invention showing a connection between two concentric pipes, the inner of such pipes extending forward beyond the outer pipe adapted for securement to a connecting pipe.

Figure 6:
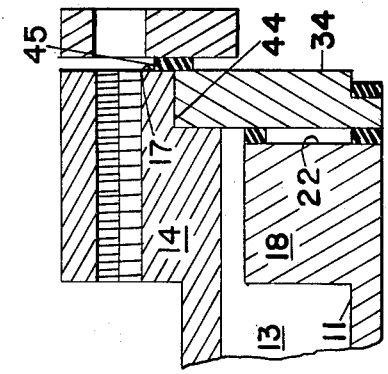
Figure 4:
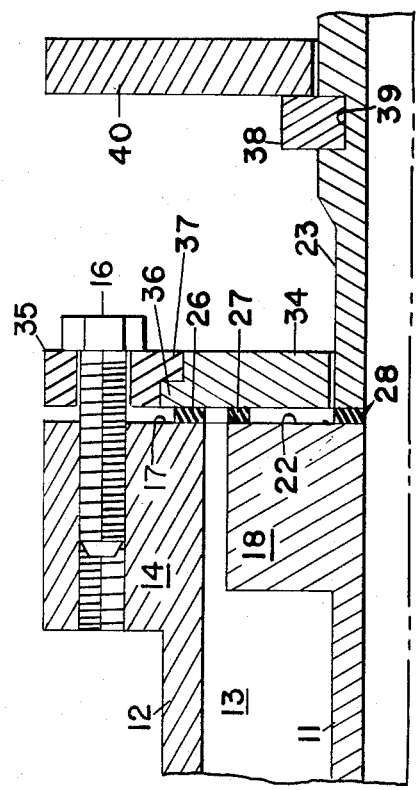
Figure 5:
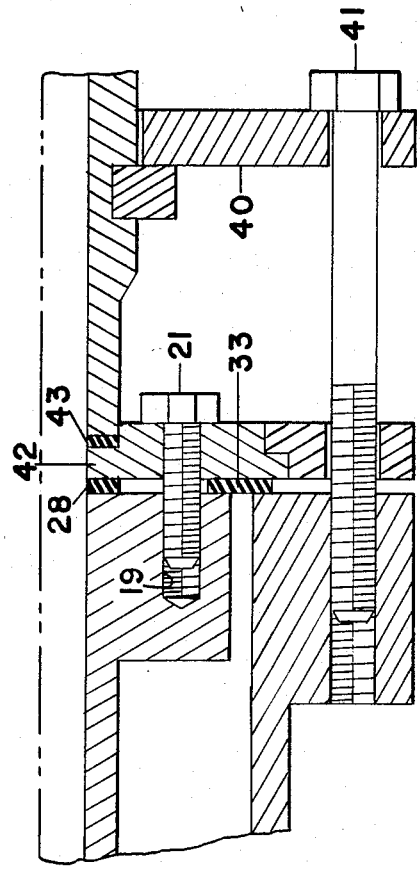

Figs. 4, 5, and 6 are partial sectional views similar to Fig. 1 illustrating different embodiments of this invention.

Refer now to Figs. 1 and 2 of the drawing in which "forward" shall be considered to the right. An inner pipe 11, which may be the end portion of a U-tube, is disposed within an outer pipe or shell 12 and is spaced therefrom to form an annular chamber 13 adapted to contain fluid under pressure. The forward end of the shell 12 has an annular radial flange 14 provided with a series of circumferentially arranged threaded holes 15 for the reception of a plurality of bolts 16 (only one of which is shown). Flange 14 has a sealing surface 17 on its forward end. Inner pipe 11 has an annular radial flange 18 adjacent the shell flange 14 which is likewise provided with circumferentially arranged threaded holes 19 for the reception of bolts 21 (only one of which is shown in Fig. 2). Pipe 11 also has a sealing surface 22 thereon located concentric with the sealing surface 17 on the shell flange 14. The outer periphery of flange 18 is located in close proximity to the inner periphery of shell 12 to substantially close chamber 13 on its forward end. A joint is thus formed between the inner pipe 11 and the outer pipe or shell 12. Although the drawings illustrate flange 18 as being spaced slightly from the inner periphery of shell 12, in actual practice the construction can be dimensioned so that a sliding fit is provided therebetween.

A connecting pipe 23 is secured to the inner pipe 11 to supply or receive fluid therefrom. Two constructions to effect such securement are illustrated in Figs. 1 and 2. In Fig. 1, the connecting pipe 23 is shown as having an integral flange or clamping ring 24. In Fig. 2 the connecting pipe 23 is formed with a shoulder 25 and a separate clamping ring 24a is provided. In both cases, two series of bolts 16 and 21 are circumferentially disposed to clamp the connecting pipe 23 to the concentric pipe assembly. Annular gaskets 26 and 27 are disposed on sealing surfaces 17 and 22 respectively and a third gasket 28 is disposed between the sealing surface 22 near the inner periphery of the inner pipe and the connecting pipe 23. Any leakage past gaskets 27 or 28 into the space 29 will be drained off through hole 31. If desirable, gaskets 26 and 27 can be provided as one gasket, as illustrated in Fig. 3. Thus a fluid tight connection is provided between the inner pipe 11 and the shell 12 and also between the inner pipe 11 and the connecting pipe 23.

Refer now to Fig. 3 wherein like parts are identified with the same numerals as in Figs. 1 and 2. In this embodiment, the inner pipe has an extension 32 which projects forward beyond the shell 12 and clamping ring 24b for connection to the supply or receiving pipe. The inner pipe 11, the outer pipe 12, and the clamping ring 24b are arranged in the same manner as illustrated in Figs. 1 and 2. However, a single gasket 33 is provided at the joint between the inner pipe and the shell.

To assemble the connections illustrated in Figs. 1 and 2 into operative position, the inner pipe 11 is first inserted into the shell 12. Gaskets 26 and 27 are arranged on sealing surfaces 17 and 22 respectively, and gasket 28 is arranged on sealing surface 22 adjacent the inner periphery of the inner pipe 11. In the construction shown in Fig. 2, the connecting pipe 23 is positioned against gasket 28, and the clamping ring 24a is located against shoulder 25 and secured to the inner pipe 11 by threaded bolts 21. Gasket 28 between the inner pipe and the connecting pipe 23 is urged into sealed position as the bolts 21 are tightened, as is gasket 27 between the inner pipe 11 and the clamping ring 24a. It should here be noted that the inner pipe 11, when secured to the connecting pipe 23, is free to move axially forward in relation to shell 12. Clamping ring 24a is next bolted to flange 14 by means of threaded bolts 16. As the bolts 16 are tightened, the gasket 26 assumes its sealing position and a simple effective connection is thus provided.

If gasket 27 should leak during operation, the leakage will drain through hole 31. Bolts 21 can then be retightened. Gasket 28 is tightened in the same manner. If gasket 26 should leak, such leakage can be eliminated by retightening bolts 16.

It should be pointed out that in this arrangement, it is impossible for any of the shell side fluid to mix with the tube side fluid due to leakage past gaskets 27 or 28. Any leakage into space 29 is drained off through hole 31 and no pressure is allowed to accumulate therein.

The connection as shown in Fig. 3 is assembled as follows. Gasket 33 is arranged on sealing surfaces 17 and 22 so that it spans the joint therebetween. Clamping ring 24b is then positioned to surround extension 32 of the inner pipe 11 and is tightened down by bolts 21 against flange 18 so that the inner peripheral portion of gasket 33 is sealed therebetween. The inner pipe can still be moved axially forward of shell 12 thus far assembled. The clamping ring is next secured to flange 14 by bolts 16 thereby securing the inner pipe 11 to the shell 12. The outer peripheral portion of gasket 33 is compressed between the sealing surface 17 on the shell flange 14 and the clamping ring 24b when bolts 16 are tightened thus forming a fluid tight seal. Leakage past gasket 33 either radially inward or outward can be eliminated by independently tightening either bolts 16 or 21 as the case may be.

Refer now to Fig. 4 of the drawings. The inner pipe 11 and the outer pipe or shell 12 are arranged in relation to each other in the same manner as in Fig. 1 and are provided with aligned sealing surfaces 22 and 17 respectively. Gasket 26 is disposed on sealing surface 17 adjacent the radially outer side of the joint between flanges 18 and 14 and gaskets 27 and 28 are disposed on sealing surface 22. Gasket 27 is adjacent the radially inner side of the joint between flanges 18 and 14 and gasket 28 is between the flange 18 and the end surface of connecting pipe 23. Concentric clamping rings 34 and 35, mated by means of flanges 36 and 37, are arranged opposite the sealing surfaces and are clamped into service position to tighten the gaskets by means of two series of circumferentially arranged bolts 16 and 21 (only one of each being shown). The connecting pipe 23 of this embodiment is provided with a split ring 38 disposed in slot 39 to serve as a fulcrum for clamping ring 40. A series of circumferentially arranged bolts 41 (only one of which is shown) extend through clamping ring 40 and are threaded into flange 14 (see Fig. 5) to clamp the connecting pipe 23 against gasket 28 thereby to seal the joint.

In Fig. 5, the inner one of the concentric sealing rings, viz. ring 34, has an extension 42 which projects between the flange 18 and the end of connecting pipe 23. In this modification, a gasket 43 is disposed between the extension 42 and the connecting pipe 23. When ring 40 is clamped into service position by bolts 41, connecting pipe 23 is drawn toward flange 14 so that gasket 43 is tightly sealed.

Fig. 6 illustrates a construction similar to Fig. 4 in which the sealing ring 34 is positioned within a cut-out portion 44 of flange 14. A gasket 45 spans the joint formed between the outer periphery of the sealing ring 34 and the flange 14. Ring 35 is tightened against gasket 45 by bolts 16 threaded into flange 14 as shown in Fig. 4.

To assemble the connection illustrated in Fig. 4 into operative position, the inner pipe 11 is first inserted into the shell 12. Gaskets 26 and 27 are arranged on sealing surfaces 17 and 22 respectively. Sealing ring 34 is positioned against gaskets 26 and 27. Bolts 21 extend through sealing ring 34 and are threaded into flange 18 of the inner pipe 11 to seal gasket 27 therebetween upon tightening of the bolts. Shoulder or flange 37 of the sealing ring 35 is placed against shoulder or flange 36 of the sealing ring 34. Bolts 16 extend through sealing ring 35 and are threaded into flange 14 of the shell 12. Tightening of bolts 16 causes sealing ring 35 to force sealing ring 34 against gasket 26. The gasket 26 is thereby compressed between flange 14 and sealing ring 34 to form a fluid tight seal therebetween. Thus far assembled, the inner pipe 11 is secured to the outer pipe 12 and a fluid tight connection is provided to close the end of chamber 13. The connecting pipe 23 is positioned against gasket 28 on sealing surface 22. Bolts 41 are threaded into flange 14 and upon tightening of the bolts, the connecting pipe 23 is forced against gasket 28 to form a fluid tight connection between the inner pipe 11 and the connecting pipe 23 for fluid transfer therethrough. Leakage past either of gaskets 26, 27, or 28 can be eliminated by tightening either of bolts 16, 21, or 41 respectively as the case may be. Tightening of one gasket can thus be effected independently of the other gaskets.

The assembly of the connection illustrated in Fig. 5 is slightly different from that just described for Fig. 4. In this construction, the clamping ring 34 seals against both gaskets 27 and 28 when the bolts 21 are tightened. Gasket 43 is positioned on extension 42 of sealing ring 34 for contact with the connecting pipe 23. Pipe 23 is positioned against gasket 43 and is sealed thereagainst by tightening bolts 41 threaded into flange 14.

The connection shown in Fig. 6 is assembled in the same manner as illustrated and described for Figs. 4 and 5 with exceptions that are obvious and are not necessary to describe in detail.

While there have been hereinbefore described approved embodiments of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A union for connecting an inner pipe and an outer pipe spaced from each other to form an annular chamber for the reception of fluid under pressure, said union comprising a flange on the end of the outer pipe; a sealing surface on said flange; a flange on the inner pipe extending radially outward to substantially close one end of said chamber and to form an annular joint between the inner pipe and the outer pipe; a sealing surface on the inner flange; sealing means disposed against said sealing surfaces to seal the joint between the pipes; a series of screws extending through the sealing means into the outer pipe; and a series of screws extending through the sealing means into the inner pipe whereby the sealing means can be tightened independently against the inner pipe flange and the outer pipe flange to seal the joint therebetween.

2. A union for connecting an inner pipe and an outer pipe which are spaced from each other to form an annular chamber for the reception of fluid under pressure, said union comprising a flange on the end of the outer pipe, said flange having a forwardly facing sealing surface thereon; a flange on the inner pipe extending radially outward to form a joint with the outer pipe, said last mentioned flange having a forwardly facing sealing surface thereon; annular clamping means disposed opposite said sealing surfaces and covering the joint; gasket means on such sealing surfaces; screw means extending through said clamping means and associated with the outer pipe for clamping said clamping means against the gasket means on the sealing surface on the outer pipe flange; and second screw means extending through said clamping means and associated with the inner pipe for sealing said clamping means against the gasket means on the sealing surface on the inner pipe flange.

3. In a heat exchanger of the shell and tube type in which one fluid passes through an inner pipe spaced from an outer pipe or shell to form a chamber for the transfer of a second fluid in heat exchange relation to the first fluid, the chamber having closure means at its end in which there is a joint between the inner and outer pipes and the inner pipe being secured in fluid tight engagement with a connecting pipe, a structure for sealing the closure joint and the joint at the inner pipe and connecting pipe comprising a radial flange on the inner and outer pipes, a sealing surface on each of said flanges, gasket means on the sealing surfaces, sealing means abutting the gasket means, first screw means extending through said sealing means and threaded into the inner pipe flange to seal the gasket means thereagainst, second screw means extending through said sealing means and threaded into the outer pipe flange to clamp the gasket means therebetween, and third screw means carried by the connecting pipe and threaded into the outer pipe flange to force said connecting pipe and inner pipe into a fluid tight connection.

4. In a heat exchanger of the type having concentric inner and outer pipes to form an annular chamber for the reception of fluid under pressure, a union for connecting the inner pipe to the outer pipe and the inner pipe to a connecting pipe in fluid tight relation, said union comprising a flange formed on the end of the outer pipe, said flange having a forwardly facing sealing surface thereon; a flange on the inner pipe extending into contiguity with the outer pipe flange and having a forwardly facing sealing surface thereon, said inner pipe flange extending substantially to the inner periphery of the outer pipe to substantially close the chamber and form a joint between the pipes; gasket means on the sealing surfaces; sealing means disposed against said gasket means to seal the joint between the pipes; a series of screws extending through the sealing means into the outer pipe to seal the gasket means thereagainst; a series of screws extending through the sealing means into the inner pipe whereby the sealing means can be tightened independently against the inner pipe flange to seal the gasket means thereagainst; a sealing surface on the connecting pipe; a gasket on said sealing surface; and screw means carried by the connecting pipe and anchored in the outer pipe flange adapted to seal the gasket thus to establish a fluid tight connection between the inner pipe and the connecting pipe.

References Cited in the file of this patent
UNITED STATES PATENTS

| | | |
|---|---|---|
| 1,570,974 | Stevens | Jan. 26, 1926 |
| 1,720,586 | Allan et al. | July 9, 1929 |
| 2,196,895 | Bowman | Apr. 9, 1940 |
| 2,305,590 | Marburg | Dec. 22, 1942 |
| 2,385,754 | Baker | Sept. 25, 1945 |
| 2,449,052 | Brown | Sept. 14, 1948 |
| 2,471,658 | Shaffer | May 31, 1949 |
| 2,617,554 | Smith | Nov. 11, 1952 |
| 2,745,683 | Nihlen | May 15, 1956 |

FOREIGN PATENTS

| | | |
|---|---|---|
| 711,321 | Great Britain | June 30, 1954 |